United States Patent [19]

Sweeney

[11] Patent Number: 4,984,903
[45] Date of Patent: Jan. 15, 1991

[54] METHOD OF OPTICALLY AND REMOTELY SENSING SUBSURFACE WATER TEMPERATURE

[75] Inventor: Harold E. Sweeney, Menlo Park, Calif.

[73] Assignee: GTE Government Systems Corporation, Stamford, Conn.

[21] Appl. No.: 387,734

[22] Filed: Aug. 1, 1989

[51] Int. Cl.$^5$ .................. G01K 5/00; G01K 13/00; G01J 5/48

[52] U.S. Cl. .................. 374/123; 374/129; 374/133; 374/136; 356/43; 356/349

[58] Field of Search ............... 374/123, 124, 127, 129, 374/130, 133, 136, 159, 161, 117; 356/43, 349

[56] References Cited

U.S. PATENT DOCUMENTS

| 3,611,806 | 10/1971 | Hishikari | 374/129 |
| 4,030,362 | 6/1977 | Dimeff | 374/129 |
| 4,375,164 | 3/1983 | Dodge et al. | 374/136 |
| 4,778,261 | 10/1988 | Boyd et al. | 350/354 |

OTHER PUBLICATIONS

Optical Phase Conjugation by V. V. Shkunov, et al., "Scientific American," pp. 54–59.
Applications of Optical Phase Conjugation by D. M. Pepper, "Scientific American," pp. 74–83 (Jan. 1986).
Guagliardo et al., "Range-Resolved Brillouin Scattering Using a Pulsed Laser", 18 Sep. 1979, Rev. Sci. Instrum. 51(1), pp. 79–81.
Hirschberg et al., "Speed of Sound and Temperature in the Ocean by Brillouin Scattering", 1 Aug. 1984, Applied Optics, vol. 23, No. 15, pp. 2624–2628.
Hach, "A Very Sensitive Airborne Microwave Radiometer Using Two Reference Temperatures", IEEE Transactios on Microwave Theory & Techniques, 9/1968, pp. 629–636.
Foley, "High Speed Optical Pyrometer", The Review of Scientific Instruments, vol. 41, No. 6, Jun. 1970, pp. 827–834.

Primary Examiner—William A. Cuchlinski, Jr.
Assistant Examiner—Alvin Wirthlin
Attorney, Agent, or Firm—Douglas M. Gilbert; John F. Lawler

[57] ABSTRACT

To remotely measure the unknown subsurface temperature $T_s$ of a bulk transparent medium such as ocean water, a laser beam having a high power or intensity is split into two parts, a probe beam and a reference beam. The probe beam is directed into a sample of ocean water, and the reference beam into a reference sample of water having a known temperature $T_r$. The intensities of the two beams, which exceed a predetermined threshold are sufficient to cause stimulated Brillouin scattering (SBS) within the two samples and produce therefrom two phase-conjugate beams. The two phase-conjugate beams are mixed to produce a heterodyne frequency that is proportional to the difference in temperature $T_s$ and $T_r$. The frequency difference is converted into a temperature value equal to the value of $T_s$.

2 Claims, 2 Drawing Sheets

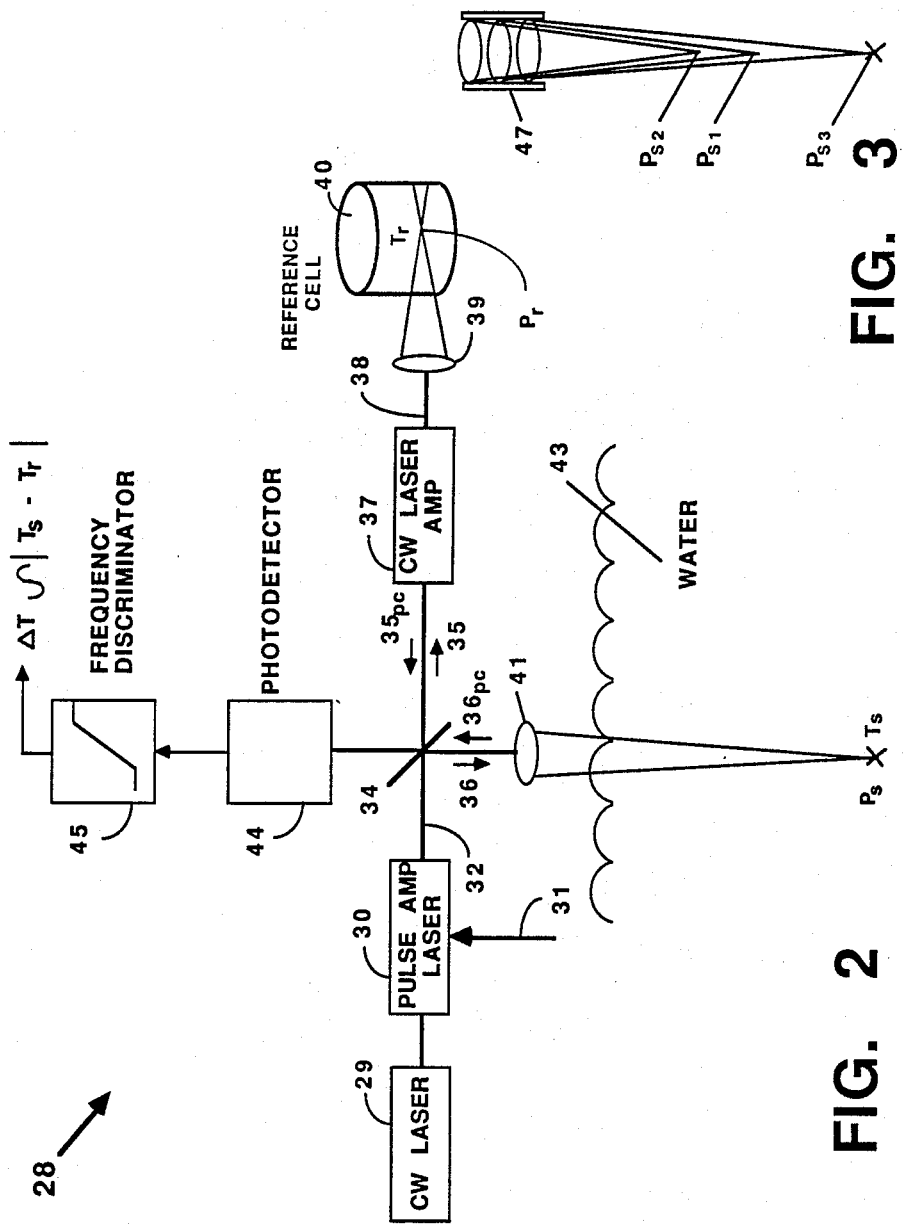

METHOD OF OPTICALLY AND REMOTELY SENSING SUBSURFACE WATER TEMPERATURE

This invention was made with Government support under Contract No. N00014-87-C-0739 awarded by the Department of the Navy. The Government has certain rights in this invention.

CROSS-REFERENCES TO RELATED APPLICATIONS

The invention described herein relates generally to the following patent applications: "Apparatus for and Method of Remotely Sensing Sub-Surface Water Temperatures," Ser. No. 064,371, filed June 27, 1987 now U.S. Pat. No. 4,867,564. "Method of Remotely Submarines Using a Laser," Ser. No. 064,375, filed June 22, 1987 now U.S. Pat. No. 4,867,558.

"Remote Subsurface Water Temperature Measuring Apparatus with Brillouin Scattering," Ser. No. 386,383, filed July 18, 1989.

"A Remote Method of Measuring Subsurface Water Temperatures", Ser. No. 400,255, filed Aug. 29, 1989.

"Remote Subsurface Water Temperature Measuring Apparatus", Ser. No. 387,735, filed Aug. 1, 1989.

BACKGROUND OF THE INVENTION

1. Field of the Invention

The present invention relates to the remote measurement of properties of transparent media, such as subsurface ocean temperature profiles, and in particular to improved apparatus for and a method of remotely measuring such temperature profiles from surface or subsurface vessels or aircraft.

DESCRIPTION OF THE PRIOR ART

There are several applications for remotely sensing or measuring the temperature of a bulk transparent medium such as water. One such application is the sounding of temperature profiles in the ocean which is useful for a variety of oceanographic purposes such as in measuring the depth of the thermocline, sensing internal waves, measuring heat content of the oceans for meteorological applications and mapping acoustical propagation paths sensitive to temperature gradients. Intrasensitive temperature sensors, such as thermistors, thermocouples, etc., have been used in the past for these purposes but, because they are not remote sensors, they are slow and awkward. A remote sensing technique in wide use is the monitoring of thermal radiation; this technique, however, is limited to measuring predominately surface temperatures.

This invention is directed to an improved technique for remotely measuring temperatures within, i.e., below the surface of suitable transparent media or substances, for example sea water.

OBJECTS AND SUMMARY OF THE INVENTION

The foregoing problems are generally solved and a technical advance achieved in an embodiment of the invention in a method for remotely and substantially instantly measuring the subsurface temperature of a transparent substance, such as water.

A further object is the provision of such a method that requires a relatively compact and highly portable apparatus.

Another object of this invention is the provision of such a method that has a high signal-to-noise (S/N) ratio and, therefore, produces highly accurate measurements.

A broad object is the provision of such a method in which the signal level in the received return signal from the target substance is relatively high providing an excellent S/N ratio.

These and other objects of the invention are achieved by generating a high power pulsed laser beam capable of producing stimulated Brillouin scattering (SBS), splitting this beam into two sub-beams and directing one sub-beam, designated the probe beam, into a transparent medium of unknown temperature (the sample medium) and thereby producing a phase-conjugate beam from the sample medium. The other sub-beam is directed into a transparent medium of known temperature (the reference medium) thereby producing a phase-conjugate beam from the reference medium. The return phase-conjugate beams from both mediums are mixed together to derive a difference frequency proportional to the difference between the temperature of the sample medium and the reference medium. The difference frequency value is then converted to a value indicative of the unknown temperature. The invention also comprehends using a cw laser beam to generate a continuous PC signal from the reference substance, and mixing the PC signals from both the pulsed laser and from the cw laser to produce a difference frequency proportional to the unknown temperature. The advantage of the later method is that the range of the test medium need not correspond to the range of the reference cell, and can be constantly changing.

BRIEF DESCRIPTION OF THE DRAWINGS

For a better understanding of the invention reference is made to the following description which is to be read in conjunction with the accompanying drawings wherein:

FIG. 2 is a schematic drawing illustrating an alternate method of the invention and useful in probing ocean water for temperatures at varying depths.

FIG. 3 is a schematic representation of a modified form of the invention of FIG. 2 showing a variable focus lens and the effect thereof.

DESCRIPTION OF PREFERRED EMBODIMENTS

Figure 1:
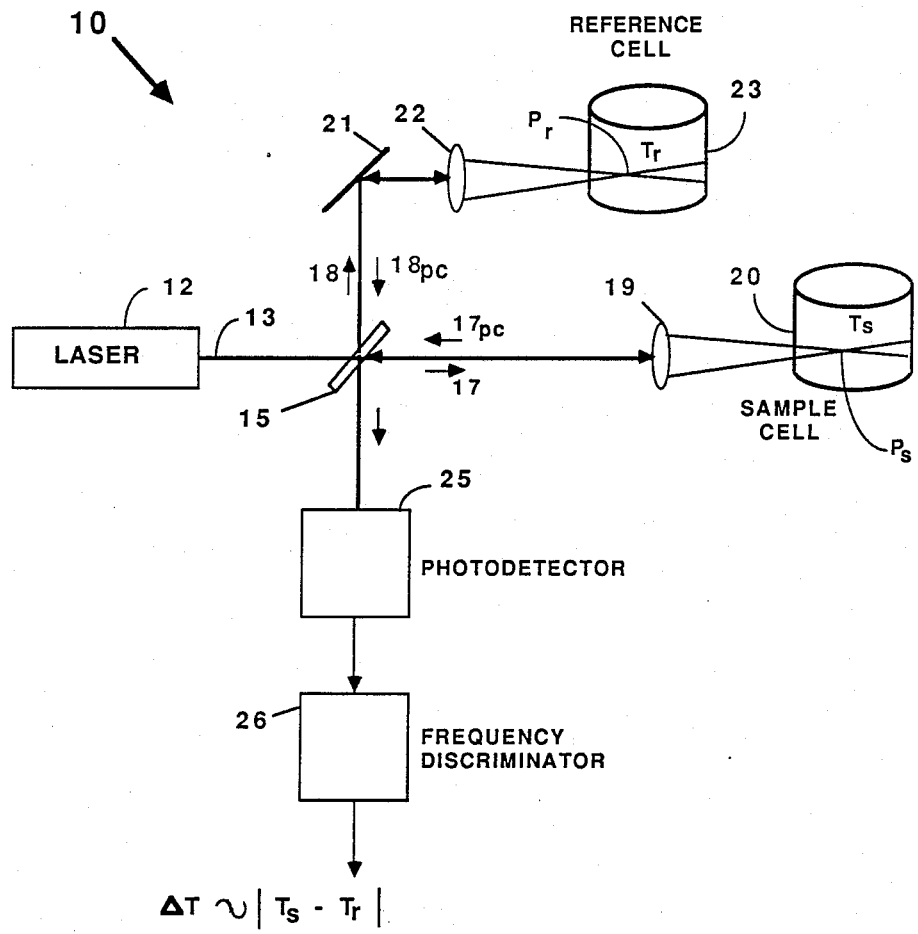
FIG. 1 is a schematic drawing illustrating the principles of the method of the invention and useful in probing ocean water for temperatures at a constant depth.

Referring now to the drawings, FIG. 1 illustrates temperature measuring apparatus 10 useful in illustrating the basic principles of the invention. Such apparatus comprises a pulsed laser 12 having an output beam 13 and a partially transmitting beam splitter 15 which further divides beam 13 into a first sub-beam 17 and a second sub-beam 18, the directions of propagation of which are indicated by arrows 17 and 18. Sub-beam 17 passes through focussing lens 19 which focusses the beam at focal point $P_s$ in a sample cell 20 containing a transparent substance or medium, such as sea water, having an unknown temperature $T_s$ at the focal point $P_s$.

Sub-beam 18 passes to mirror 21 which directs beam 18 to focussing lens 22 which focusses beam 18 at focal point $P_r$ in a reference cell 23 containing a transparent material or substance preferably similar to that of cell 20 and having an known temperature $T_r$ at focal point $P_r$.

When the intensity or irradiance of the pulses comprising output beam 13 of laser 12 exceeds a predetermined threshold level, sub-beams 17 and 18 produce stimulated Brillouin scattering (SBS) in cells 20 and 23 resulting in the generation of phase-conjugate or "time-reversed" beams whose rays run along the same trajectories, but in opposite directions, as sub-beams 17 and 18. The directions of the PC beams are designated by the arrows $17_{pc}$ and $18_{pc}$. This phenomenon, called optical phase conjugation, is well known and is described in detail in articles entitled *Optical Phase Conjugation* by V. V. Shkunov et al., Scientific American, pages 54–59 (September 1985) and *Applications of Optical Phase Continuation* by D. M. Pepper, Scientific American, pages 74–83 (January 1986).

The Brillouin backscatter optical wave from a spontaneously generated photon interacts with the probe beam and the interaction produces a traveling electric field that travels exactly at the sound velocity in the particular substance. If the light intensity is great enough and the electrostrictive coefficient of the medium is sufficiently strong, this traveling electric field will create an acoustic field which aligns itself in a column with the probe beam and the backscattered beam at the expense of scattering in other directions. Hence the collection of light is more efficient in SBS than in spontaneous Brillouin scattering.

The presence of the induced electric field traveling at the sound velocity can be derived in the following manner. Assume that an electromagnetic wave (the probe laser) propagates in a substance in the $+x$ direction with velocity c, then the electric field may be written as $$E_1 = E_o \sin(\omega_1 t - \omega_1 x/c) \tag{1}$$

where, $E_o$ = magnitude of the wave,
$\omega$ = frequency, and
$t$ = time parameter, and assume that a wave of different frequency (the Brillouin scattering) propagates in the -x direction, the electric field of which is written as, $$E_2 = E_o \sin(\omega_2 t + \omega_2 X/C), \tag{2}$$

where, $\omega_2$ = frequency of the second wave.
The total electric field in their common region is
$$E = E_1 + E_2 = E_o[\sin(\omega_1 t - \omega_1 X/C) + \sin(\omega_2 t + \omega_2 X/C)] \tag{3}$$
which can be arranged by trigonometric identities to the form $$E = 2E_o\{\sin\tfrac{1}{2}[(\omega_1 + \omega_2)t - (\omega_1 - \omega_2)x/c]\}\{\cos\tfrac{1}{2}[(\omega_1 - \omega_2)t - (\omega_1 + \omega_2)x/c]\} \tag{4}$$

which is of the form of a high frequency $(\omega_1+\omega_2)$ signal modulated with a low frequency $(\omega_1-\omega_2)$ envelope. The velocity of the envelope is found by making its argument constant, i.e., $$(\omega_1-\omega_2)t-(\omega_1+\omega_2)X/C=K. \tag{5}$$

The envelope velocity is therefore, $$dx/dt = (\omega_1-\omega_2)C/(\omega_1+\omega_2) = (f_1-f_2)C/(f_1+f_2). \tag{6}$$

In the case of Brillouin scattering $f_2$ has been produced by Doppler shift by interacting with an acoustic wave at velocity v. The Doppler equation, namely $$f_2 = f_1(C-V)/(C+V), \tag{7}$$

which when solved results in the following expression:

$$c = (f_1+f_2)V/(f_1-f_2) \tag{8}$$

A substitution into the prior expression (6) for dX/dt yields dx/dt TM v. The envelope of the composite electric field wave therefore travels exactly at the acoustic velocity.

In order to achieve SBS, a predetermined threshold intensity level for the optical probe beam must be exceeded. This intensity level must be sufficient so that the following relationship exists:

$\exp[GIL] \geqq 10^{13}$
or,
$\exp[GIL] \geqq \exp[30]$,
(since $10^{13} = \exp[30]$).

Or more simply, the intensity, $I \geqq 30/GL$, where,
G = a gain parameter which is a property of the medium, m/W
I = intensity of the optical probe beam (W/m$^2$) and,
L = interaction length, m, see *Principles of Phase Conjugation* by Zel'dovich et al., Springer-Verlag, Vol 42, page 29, Springer Series on Optical Sciences (Springer Verlag Berlin Heidelberg, 1985). (For water G is typically $5 \times 10^{-11}$m/W )

The sound velocity in water is related to the temperature and salinity and is given in the article entitled, *Development of Simple Equations for Accurate and More realistic Calculation of the Speed of Sound in Sea Water.* by C. C. Leroy, Journal of Acoustical Society of America, No. 216, page 216 (1969), as follows:

$$v = 1492.9 + 3(T-10) - 0.006(T-10)^2 - 0.04(T-18)^2 + 1.2(S-35) - 0.01(T-18)(S-35) \pm Z/61 \tag{9}$$

where,
T = temperature in ° C.,
S = salinity in parts per thousand,
Z = depth in meters.

The phase conjugate of sub-beam 17, designated $17_{pc}$, propagates from cell 20 precisely along the same path as sub-beam 17, except in the opposite direction, reflected off beam splitter 15 to photodetector 25 such as a photodiode. Similarly, the phase conjugate of sub-beam 18, designated $18_{pc}$, propagates from reference cell 23, through lens 22, off mirror 21, through splitter 15 and ultimately to photodetector 25.

A phase-conjugated beam derived from SBS has its optical frequency shifted by a frequency that produces an acoustical wavelength in the water equal to half the optical wavelength, i.e.

$$\Delta v = (2)\frac{v_a n}{\lambda} \tag{10}$$

where,
$\Delta v$ = the optical frequency shift,
$v_a$ = the acoustic velocity in water,
n = the index of refraction in water, and
$\lambda$ = the wavelength of the incident beam in a vacuum.

Since both phase-conjugate beams $17_{pc}$ and $18_{pc}$ are conjugates of the same incident beam, their respective wavefronts are identical. Photodetector 25 mixes beams $17_{pc}$ and $18_{pc}$ and because their wavefronts are identical, ideal optical heterodyning occurs with high mixing efficiency. The heterodyne frequency produced by photodector 25 is proportional to the difference of the shifted frequencies which is directly proportional to the difference in the acoustic velocities which in turn is predominantly proportional to the difference in temperatures $T_s$ and $T_r$ at the respective focal points $P_s$ and $P_r$ of cells 20 and 23, respectively. By assigning cell 23 as a reference cell and accurately controlling its temperature, the unknown temperature $T_s$ of cell 20 can then be measured. The output of photodetector 25 is received by a frequency measuring device 26, such as a frequency discriminator, which directly converts it into a value of temperature equal to $|T_s-T_r|$. From this $\Delta T$ it is a simple matter to derive $T_s$.

It is important that the pulses from phase-conjugate beams $17_{pc}$ and $18_{pc}$ arrive at the active mixing surface of photodetector 25 at the same time for effective heterodyning of these two signals. Since there is no optical storage mechanism, if the pulses from the two beams are not properly timed to arrive at photodetector 25 at substantially the same instant, the two pulses will not mix with each other. To this end, the optical spacing of the distance of focal points $P_r$ and $P_s$ from photodetector 25 need to be the same. This means that the optical path distance between photodetector 25 and each of the cell focal points must be equal.

Certain variations of the basic technique may be used to achieve beneficial results. For example, referring again to FIG. 1, the substances or media of cells 20 and 23 need not be the same. Rather the material of reference cell 23 and its temperature may be selected to produce a convenient heterodyne difference frequency for the expected test sample of cell 20. Also, by controlling the temperature of reference cell 23 advantageously enables selection of a reference temperature $T_r$ close to the expected temperature of the test cell, $T_s$. This results in less demand on the speed of the photodetector. For example, if the expected temperature, $T_s$, of the test media is 20° C., this produces a 7.45 GHz frequency shift from the frequency of the incident beam. By selecting the reference cell temperature $T_r$ to be 10° C., which corresponds to a frequency shift of 7.20 GHz, the frequency difference between the two is only 250 MHz (i.e., 7.45 GHz−7.20 GHz=250 MHz) as compared to 7.45 GHz without the reference cell. In addition, apparatus which utilizes two phase-conjugate beams provides optimum mixing performance.

As mentioned above, a precondition to successful utilization of the two-cell apparatus and technique is the necessity that phase-conjugate reference beam pulse $18_{pc}$ be present at the photodetector cathode at essentially the same time as the return phase-conjugate sample beam pulse $17_{pc}$. In some applications, however, the probe range may be unknown or varying, as when the apparatus is mounted on an aircraft and thus time coincidence of pulse excitation of the photodetector is more difficult to control.

In order to overcome this limitation under such circumstances, a continuous-wave laser may be employed as is shown by apparatus 28 in FIG. 2. Apparatus 28 comprises a low-power spectrally-pure continuous wave (cw) laser 29, called a "seeder" laser, which feeds a low-level cw input to a pulse-amplifier laser 30, which is triggered by an optical pulse (flash) from a suitable source (not shown) on path 31. By way of example, laser 29 may be a Nd:YAG laser and laser 30 a flash-pumped Nd:YAG. The output beam 32 of pulse laser 30 comprises a low power level cw beam and periodic high power level pulses. Output beam 32 is incident on beam splitter 34 which divides laser beam 32 into sub-beams 35 and 36. Sub-beam 35 passes from splitter 34 to laser amplifier 37. Amplifier 37 operates near saturation to suppress the pulse components in sub-beam 35 and to amplify the cw component to an intensity level which exceeds that needed to produce SBS. The output beam 38 of amplifier 37 is incident on converging lens 39 which focusses the intense cw beam on reference cell 40 similar to cell 23 of FIG. 1. Cell 40 contains a transparent material such as water and acts as a temperature reference for the measuring apparatus. Lens 39 focusses sub-beam 35 at the point within reference cell 40 designated $P_r$, the temperature of which, $T_r$, is controlled and known. The other portion of beam 32 is partially reflected as sub-beam 36. Converging lens 41 focusses sub-beam 36 on focal point $P_s$ below the surface of a body of water 43, the temperature $T_s$ of which at point $P_s$ is unknown.

As discussed above, the pulse power of sub-beam 36 and the continuous power of sub-beam 38 exceed the power threshold needed to produce SBS in body 43 and cell 40. The phase-conjugates $35_{pc}$ and $36_{pc}$ of those beams travel through or reflect off of splitter 34 to photo-detector 44. Since the phase conjugate of the continuous wave from reference cell 40 is present at all times on the photocathode of detector 44, the heterodyning with pulse $36_{pc}$ from body 43 is assured regardless of variations in the spacings of focal point $P_s$ within body 43 and focal point $P_r$ in cell 40 from photodetector 44. In this manner, the range of test medium need not correspond to the range of the reference cell.

Referring to FIG. 3 the embodiment depicted in FIG. 2 may be modified to measure temperatures at varying ranges or depths in test body 43, designated in FIG. 3 as $P_{S1}$, $P_{S2}$ and $P_{S3}$, by substituting for transmitter lens 41, a transmitter lens 47 with an adjustable focus.

While the invention has been described with reference to its preferred embodiments, it will be understood by those skilled in the art that various changes may be made and equivalents may be substituted for elements thereof without departing from the true spirit and scope of the invention. In addition many modifications may be made to adapt a particular situation or material to the teachings of the invention without departing from the scope thereof as defined in the appended claims.

What is claimed is:

1. A method of remotely measuring an unknown temperature $T_s$ of a transparent medium by comparison with a known temperature $T_r$ of a transparent reference material, consisting of the steps of:

simultaneously directing into said transparent medium and into said transparent reference material a pulsed laser output beam comprising a plurality of pulses each having an intensity sufficient to cause stimulated Brillouin scattering (SBS) in said medium and in said material and thereby causing pulsed phase-conjugate (PC) beams to emanate from said medium and said material, respectively, said PC beams having frequencies proportional to the temperatures of said medium and said material, respectively;

mixing said PC beams and thereby producing a difference frequency proportional to the difference in temperatures $T_s$ and $T_r$; and converting said difference frequency to the temperature $T_s$.

2. The method according to claim 1 with an additional step of splitting said pulsed laser output beam into first and second sub-beams and directing said sub-beams into said medium and into said reference material.

* * * * *